United States Patent [19]

Davis et al.

[11] Patent Number: 4,828,909

[45] Date of Patent: May 9, 1989

[54] ELASTOMER-COATED FABRIC PRODUCTS AND PROCESS FOR PRODUCING THE SAME

[75] Inventors: Delbert A. Davis, Kernersville; James N. McGee, Jr., Pleasant Garden, both of N.C.

[73] Assignee: Highland Industries, Inc., Greensboro, N.C.

[21] Appl. No.: 134,351

[22] Filed: Dec. 17, 1987

[51] Int. Cl.$^4$ ............................................. B32B 7/00
[52] U.S. Cl. ................................ 428/253; 427/299; 427/322; 427/324; 427/331; 427/392; 427/394; 427/396; 428/254
[58] Field of Search ............... 428/253, 254; 427/299, 427/322, 324, 331, 392, 394, 396

[56] References Cited

U.S. PATENT DOCUMENTS

| | | | |
|---|---|---|---|
| 3,404,710 | 10/1968 | Pierce | 28/155 |
| 3,753,917 | 12/1974 | White, Jr. et al. | 74/234 |
| 3,872,735 | 3/1975 | Hnatek | 74/231 R |
| 3,981,206 | 9/1976 | Miranti, Jr. et al. | 74/233 |
| 4,150,581 | 4/1979 | Walters | 74/238 |
| 4,370,784 | 2/1983 | Turbull | 28/166 |
| 4,396,112 | 8/1983 | von Wietersheim et al. | 198/822 |
| 4,427,107 | 1/1984 | Roberts et al. | 198/844 |
| 4,437,865 | 3/1984 | Parekh et al. | 51/298 |
| 4,444,025 | 4/1984 | Krueger | 66/84 A |
| 4,473,521 | 9/1984 | Tassone | 264/136 |
| 4,481,051 | 11/1984 | Imamura et al. | 156/137 |
| 4,514,179 | 4/1985 | Skura | 474/204 |
| 4,518,647 | 5/1985 | Morrison | 428/250 |
| 4,567,738 | 2/1986 | Hutson et al. | 66/85 A |
| 4,570,566 | 2/1986 | Long | 118/34 |
| 4,609,578 | 9/1986 | Reed | 428/254 |
| 4,665,721 | 5/1987 | Naumann et al. | 66/203 |
| 4,677,831 | 7/1987 | Wunner | 66/84 A |

FOREIGN PATENT DOCUMENTS 0099205 1/1984 European Pat. Off. .
2102849 2/1983 United Kingdom .

OTHER PUBLICATIONS

An Introducion to Textile Finishing, J. T. Marsh, Second Edition, 1966.

Primary Examiner—Marion C. McCamish
Attorney, Agent, or Firm—Nixon & Vanderhye

[57] ABSTRACT

Elastomer-coated fabric products having predetermined potential extension in the fabric's machine direction and processes for producing the same. The fabric product of the invention preferably includes an elastomer-coated warp-knit, weft-insert fabric whereby the warp knit yarns provide a first potential elongation (as by selection of the type and/or denier of yarns employed). The fabric is compressed in the machine direction (as by overfeeding the fabric to a tenter frame during production) so as to provide a second potential elongation, and is maintained in its compressed state by virtue of the elastomer coating thereon. The first and second elongation potentials thus collectively establish the total potential elongation for the fabric in the machine direction. The cross-machine yarns, however, are chosen for their inextensible properties so that the fabric product of this invention will provide lateral support to end use products employing the same as a reinforcing medium, such as tires, power transmission belts, conveyor belts, and the like.

28 Claims, 2 Drawing Sheets

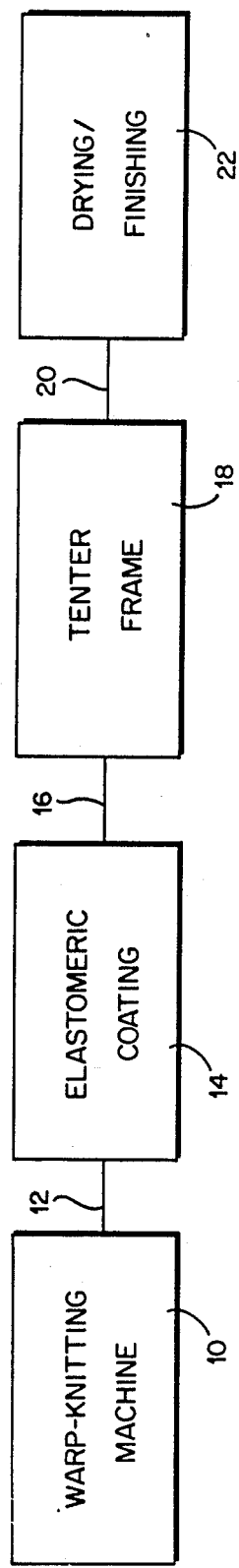
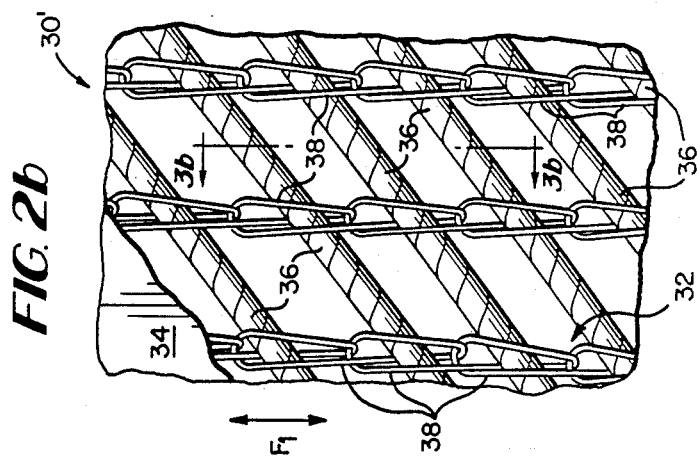
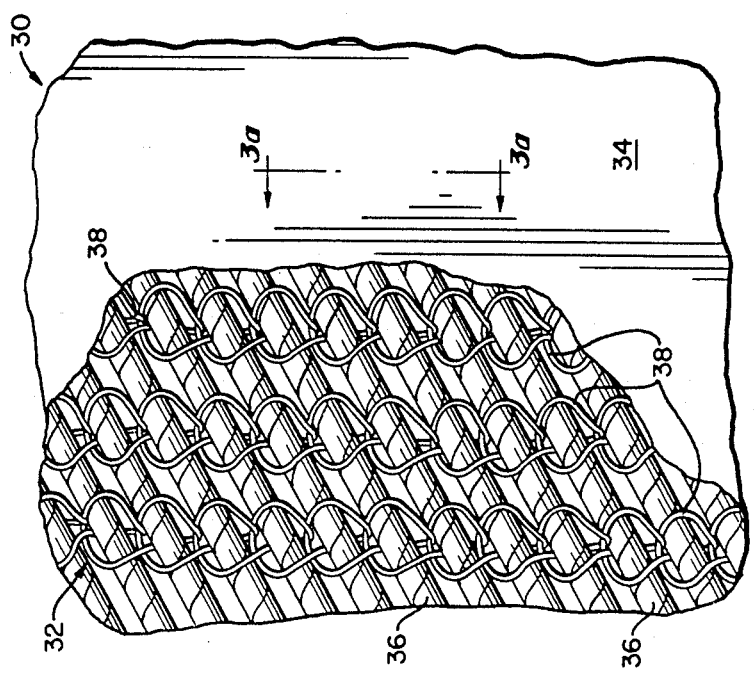
FIG. 1
FIG. 2a
FIG. 2b

ELASTOMER-COATED FABRIC PRODUCTS AND PROCESS FOR PRODUCING THE SAME

FIELD OF THE INVENTION

This invention relates to elastomer-coated fabric products useful as a reinforcing medium in a variety of end use applications (e.g., tires, power transmission belts, conveyor belts, etcetera) and to processes for producing the same. In a preferred form, it includes an elastomer-coated warp-knit, weft-inserted (WKWI) fabric having warp yarns which exhibit a predetermined elongation potential in the fabric's machine direction. Additional elongation potential for the fabric (i.e., so as to provide a total elongation potential in excess of that provided by the warp-knit yarns alone) is provided in the machine direction by maintaining the WKWI fabric in a compressed state (which is accomplished by means of the elastomeric coating). The total elongation potential of the elastomer-coated fabric of this invention is thus the elongation potential collectively provided inherently by means of the warp knit yarns and that provided by means of the compressed state of the fabric. The weft insert yarns, on the other hand, are chosen so that the fabric is substantially inextensible in the cross-machine direction.

BACKGROUND AND SUMMARY OF THE INVENTION

A variety of commercial products employ fabrics as a reinforcement medium, for example, tires, power transmission belts, conveyor belts, and the like. These products are typically constructed of layers of fabric impregnated with and/or intimately surrounded by an elastomeric polymer matrix. The fabric thus serves to reinforce the resulting elastomeric product.

In many applications, lateral support for the product is important. That is, the product should be substantially inextensible in one direction yet capable of elongation in another direction. In the past, it has been proposed that a fabric using relatively inextensible inlaid warp yarns with an extensible weft insertion yarn provides greater flexibility in the weft direction (see, published U.K. Application No. 2,102,849). Similarly, U.S. Pat. No. 4,427,107 to Roberts et al suggests having different stretch characteristics in the warp and weft directions with fibers having a warp to weft elongation ratio in the range of between 1:2 and 1:3. (See also, U.S. Pat. Nos. 4,370,784 to Turnbull; 4,514,179 to Skura; 3,872,735 to Hnatec.)

While provision of a relatively extensible yarn in one direction and a relatively inextensible yarn in another direction in fabric constructions employed as a reinforcing medium in a polymer matrix does afford an amount of elongation potential in a desired direction, oftentimes the exact amount of extension is, in practice, more/less than that desired. Accordingly, what has been needed is an elastomer-coated fabric whereby the amount of potential elongation in one of the directions thereof is closely controlled so that more accurate extension potential properties can be imparted to the resulting product in which it is employed. it is toward attaining such a product that the present invention is directed.

According to this invention, an elastomer-coated fabric product is provided which is useful as a reinforcing medium in a variety of end use applications employing the same (e.g., tires, power transmission belts, conveyor belts, etcetera). The elastomer-coated fabric product of this invention is preferably a warp-knit, weft-inserted fabric whereby the warp yarns exhibit a predetermined elongation potential in the fabric's machine direction. Additional elongation potential for the fabric is provided by this invention in the machine direction by maintaining the fabric in a compressed state. That is to say, during processing, the fabric is compressed within its plane without buckling, and this compressed state is maintained by means of the dried elastomer coating. Thus, not only do the warp knit yarns themselves contribute to the elongation potential for the resulting elastomer-coated fabric, but the amount of fabric compression can also be preselected and controlled in such a manner that the total elongation potential for the resulting fabric is within close tolerances of that desired (e.g., within about plus or minus 2%).

The fabric of this invention is preferably produced by coating a liquid elastomer onto the fabric so that it at least partially impregnates the same and then compressing the fabric to the desired extent. Alternately, the fabric may be compressed prior to the application of the liquid elastomer coating. The liquid-coated and compressed fabric is then dried so as to solidify the elastomer coating thereon and thus maintain the fabric in its compressed state. Compression of the fabric is conveniently accomplished by overfeeding the fabric to a conventional tenter frame—that is, the rate at which the fabric is fed to the tenter frame is greater than the tenter frame's operating rate.

These as well as other objects and advantages will become more clear after carefully considering the detailed description thereof which follows.

BRIEF DESCRIPTION OF THE ACCOMPANYING DRAWINGS

Reference will hereinafter be made to the accompanying drawings wherein like reference numerals throughout the various FIGS. denote like elements therein, and wherein:

FIG. 1 is a diagrammatic representation of the processing steps employed to produce the elastomer-coated fabric of this invention;

FIG. 2a is a schematic plan view of one exemplary elastomer-coated fabric of this invention shown particularly in its compressed state;

FIG. 2b is a schematic plan view of the fabric of this invention similar to that in FIGURE 2a but shown in an extended state (i.e., after a machine-direction tension force has been applied thereto);

DETAILED DESCRIPTION OF THE PREFERRED EXEMPLARY EMBODIMENTS

Figure 3A:
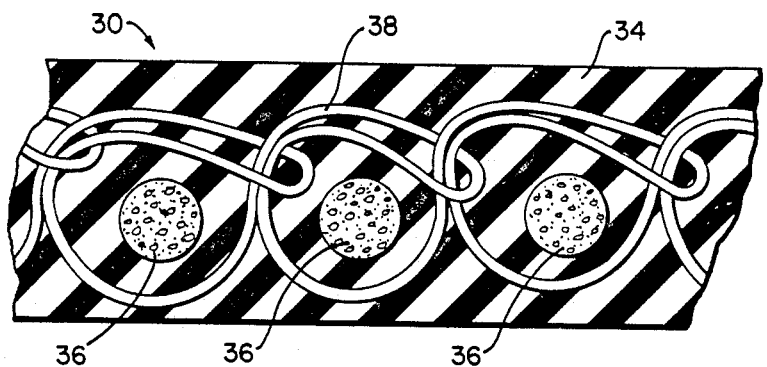
FIG. 3a is a cross-sectional schematic view of the fabric shown in FIG. 2a taken along line 3a—3a therein and particularly showing the machine direction compression (and hence potential extension) thereof.

As briefly mentioned above, an important aspect of the present invention is the fact that the fabric is normally in a compressed state and is maintained in such a compressed state by means of the elastomer coating. As used herein (and in the accompanying claims), the term "compressed" (or like terms) is meant to refer to compressing the fabric within its plane without fabric buckling, folding or the like. Thus, a "compressed" fabric according to this invention will have a decreased distance between adjacent filling yarns of the fabric as compared to a similar fabric in a non-compressed state—that is, the numerical density of filling yarns per unit length of the fabric is increased when the fabric is in a compressed state as compared to a similar fabric in a non-compressed state. As can be appreciated, this "compression" of the fabric establishes an elongation potential—that is to say, the fabric may be elongated to the extent where it is no longer in a "compressed" state.

The process for producing the fabric in accordance with the present invention is schematically shown in accompanying FIG. 1. As can be seen, a base fabric 12 is initially produced on a warp-knitting machine 10 which can be of any type conventional in the art. For example, Malimo and Tricot warp-knitting machines may be employed in the successful practice of this invention. Preferably, the filling or weft insert yarns are biased at an angle with respect to the machine direction of the fabric (i.e., between about 45° and 90°, preferably about 60°) by any suitable means known in the art. For this purpose, conventional bias weft-insertion machinery such as that disclosed in U.S. Pat. Nos. 4,444,025 to Krueger; 4,567,738 to Hutson et al; 4,665,721 to Naumann et al, and 4,677,831 to Wunner may be employed.

As is well-known, the warp-knitting machine 10 forms a plurality of warp-knitting yarns into stitch patterns (e.g., chain stitches) in which there are inserted weft filling yarns. The warp knitting yarns of this invention are preferably chosen so that they exhibit an inherent predetermined amount of extension—that is, so that the resulting fabric is extensible in the machine direction or has a predetermined elongation in the machine direction. The type of yarn chosen as well as the denier and ply thereof will determine the amount of potential elongation provided by means of the warp-knit yarns. By way of example, the yarns may be continuous and/or spun staple selected from any synthetic or natural fiber such as, nylon, cotton, polyester, rayon, aramid filaments or mixtures thereof. The cross-machine, filing or weft insert yarns may also be selected from continuous or spun synthetic and/or natural fibers. These fibers are, however, selected so that they provide substantial inextensibility in the cross-machine direction, which selection is dependent upon e.g., the type of fiber chosen and/or the type of fiber blends in addition to the denier, filling density and like fabric parameters.

The resulting base fabric (designated by reference numeral 12) is then forwarded to a coating zone 14 where it is coated with a liquid polymer or elastomer. Coating of the fabric 12 may be accomplished by any apparatus and/or technique well known to those in this art, and thus can be accomplished by padding, rolling, dipping, spraying or the like.

Any suitable elastomer may be employed in the practice of this invention, the selection of any particular elastomer being dependent upon the specific performance characteristics for the resulting reinforced product in which the fabric 12 is employed. Suffice it to say that the elastomer must be compatible with the polymer matrix in which the fabric is employed so as to ensure adequate bonding (both mechanically and chemically). The amount of liquid elastomer add-on to the fabric 12 is preferably chosen so that it is sufficient to maintain the fabric in its compressed state (as will described in greater detail below). Thus, liquid elastomer add-on may be in the range of from 30% to about 400% or more by weight of the fabric 12.

The coated fabric (now designated as reference numeral 16) is then fed to a tenter frame 18 of any type conventionally used in the textile industry. The tenter 18 should be of the continuous type and thus, those having moveable pin-chains in suitable guides may be employed. Important to the present invention is that the coated fabric is fed to the tenter frame 18 at a rate greater than the rate at which the tenter frame 18 is moving so that the fabric is "overfed" to the tenter frame 18 thereby being compressed in the machine direction.

The thus compressed and coated fabric (now designated by reference numeral 20 in FIG. 1) may then be dried in a drying zone 22 (which may be a conventional industrial oven) so as to solidify the elastomer coating on the fabric 20 and thus maintain the fabric in its compressed state. Other finishing steps may also be employed in zone 22, such as selvage removal, cutting, and/or slitting to the desired width.

The coated fabric 20 and/or the base fabric 12 may be treated according to any conventional technique so as to obtain maximum adhesion with the polymer matrix of the end-use product in which it is employed. For example, yarns of the base fabric 12 may be pretreated with any known adhesion promoting agent (e.g., RFL, isocyanate, epoxy and/or melamine formaldehydes), the selection of any particular agent(s) being, of course, dependent upon the polymer matrix in which the coated fabrics of this invention are used. If the base fabric 12 is comprised of natural fibers, blends of natural fibers and/or textured synthetic fibers, pretreatment with an adhesion promoting agent is usually not necessary for most end use applications. Furthermore, adhesion may be enhanced by subjecting the coated fabric 20 to a "precuring" step, for example, by use of heat electron beam or gamma radiation precuring system.

An exemplary fabric 30 produced by the present invention is shown in accompanying FIGS. 2a and 3a. As is seen, the fabric 30 includes a base fabric 32 which is preferably a weft-biased WKWI fabric and a coating layer 34 of an elastomeric polymer which preferably at least partially impregnates the base fabric 32. Adjacent filling (or weft-inserted) yarns 36 have been moved closer to one another due to the compression of the base fabric 32 as was described previously. This compression of the fabric thus, in essence, "loosens" the stitches of the warp knit yarns 38 as is shown schematically in accompanying FIGS. 2a and 3a.

Figure 3B:
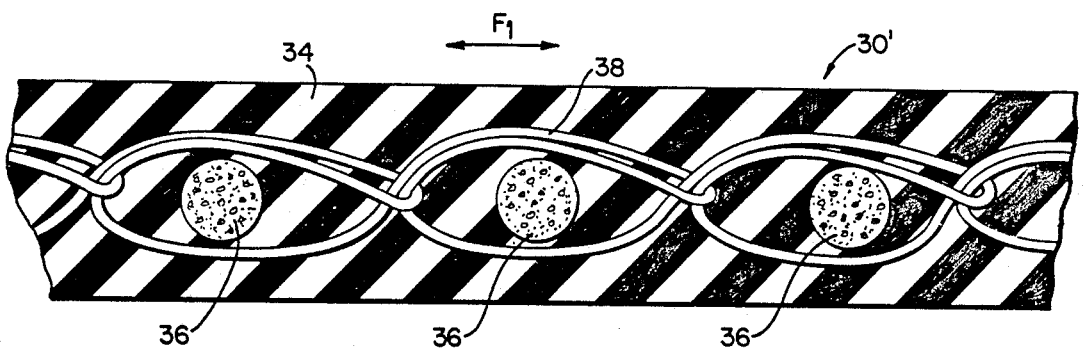
FIG. 3b is a cross-sectional schematic view of the fabric shown in FIG. 2b (i.e., in an extended state) taken along line 3b—3b therein.

When a machine direction tension force (arrow $F_1$ in FIGS. 2b and 3b) is applied to the coated fabric 30, the fabric 30 is capable of extension or elongation in the machine direction to an extended state which is shown schematically by numeral 30' in accompanying FIGS. 2b and 3b. That is, the "compression" of the fabric is removed due to such a tension force so that the fabric similarly extends in the machine direction. Any further applied machine direction tension (arrow $F_1$) causes the fabric to elongate to the extent permitted by the warp knit yarns 38 alone. This combination of potential extension provided by the warp knit yarns 38 alone and the potential extension provided due to the fabric 30 being maintained in a compressed state thus permits the fabric to be extended to any predetermined degree. Preferably, fabrics of this invention will be extensible in a machine direction in an amount between 30 to about 200%.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An elastomer-coated fabric product comprising a knit base fabric and an elastomeric coating layer on said base fabric, said knit base fabric being compressed in the machine direction thereof and maintained in said compressed state by means of said elastomeric coating.

2. A fabric product as in claim 1, wherein said base fabric is a warp-knit, weft inserted fabric.

3. A fabric product as in claim 2, wherein the weft yarns of said fabric are biased with respect to the warp-knit yarns thereof.

4. A fabric product as in claim 3, wherein said warp and weft yarns are selected from the group of natural and synthetic yarns.

5. A fabric product as in claim 1, wherein said elastomeric coating is present in an amount of about 30% to about 400% by weight of said base fabric.

6. A fabric product as in claim 1, which exhibits a potential extension of between about 30% to about 200%.

7. An elastomer-coated fabric product comprising an elastomeric layer bonded to a warp-knit fabric, said fabric including warp knit yarns providing a predetermined amount of potential elongation to the fabric, and substantially inextensible weft yarns, said fabric being in a compressed state in the warp-wise direction to provide for an additional predetermined amount of potential elongation to the fabric in excess of that provided by means of said warp knit yarns alone, and said compressed state being maintained by means of said elastomeric layer bonded to said fabric.

8. An elastomeric product including a fabric reinforcing layer which is comprised of a warp-knit, weft-inserted fabric whose warp knit yarns have a predetermined amount of potential elongation and whose weft inserted yarns are substantially inextensible and are biased with respect to said warp knit yarns, said fabric being in a compressed state in the warp-wise direction to provide for an additional predetermined amount of elongation in excess of that provided by means of said warp knit yarns alone, and said product including an elastomeric coating on said fabric to maintain the same in said compressed state.

9. A product as in claim 7 or 8, wherein said elastomer is present in an amount of about 30% to about 400% by weight of said fabric.

10. A product as in claim 7 or 8, wherein said potential extension of said fabric product is between about 30% to about 200%.

11. A product as in claim 7 or 8, wherein said warp and weft yarns are selected from the group of natural and synthetic yarns.

12. A coated warp-knit, weft-inserted fabric which is comprised of a warp-knit, weft-inserted base fabric whose warp knit yarns have a predetermined amount of potential elongation and whose weft inserted yarns are substantially inextensible, said base fabric being in a compressed state in the warp-wise direction to provide for an additional predetermined amount of elongation in excess of that provided by means of said warp knit yarns alone, and said coated fabric including a coating on said fabric to maintain the same in said compressed state.

13. A product as in claim 12, wherein said coating is an elastomer material which is present in an amount of about 30% to about 400% by weight of said fabric.

14. A product as in claim 12, wherein said potential extension of said fabric product is between about 30% to about 200%.

15. A product as in claim 12, wherein said warp and weft yarns are selected from the group of natural and synthetic yarns.

16. A fabric-reinforced product comprising a polymer matrix, and a fabric reinforcing layer, which layer is a coated fabric as in claim 12.

17. A process for producing an elastomer-coated fabric product comprising the steps of:
(a) compressing a knit base fabric in its machine direction so that said base fabric is in a compressed state; and
(b) maintaining said knit fabric in its compressed state by means of an elastomeric coating thereon.

18. A process as in claim 17 wherein step (b) is practiced by applying a liquid elastomeric coating to the base fabric prior to its compression according to step (a), and then drying said coated compressed base fabric.

19. A process as in claim 17, wherein step (b) is practiced by applying a liquid elastomeric coating to the base fabric after step (a), and then drying said coated compressed base fabric.

20. A process for producing an elastomer-coated fabric product comprising the sequential steps of:
(a) coating a base fabric with a liquid elastomer material;
(b) compressing the thus coated base fabric while the elastomer material is still liquid; and then
(c) solidifying the elastomer coating to maintain said base fabric in said compressed state.

21. A process as in claim 20, wherein step (a) is practiced by feeding a warp-knit fabric to a coating zone and then coating the fabric with said elastomer material in said coating zone.

22. A process as in claim 21, wherein prior to step (a) there is practiced the step of producing a warp-knit fabric in a knitting zone.

23. A process as in claim 22, wherein said warp-knit fabric is a warp-knit weft-inserted fabric.

24. A process as in claim 20, wherein step (c) is practiced by drying said elastomer coating in a drying zone.

25. A process as in claim 20 further comprising treating said fabric to obtain maximum adhesion with a polymer matrix.

26. A process as in claim 20, wherein step (b) is practiced by overfeeding the base fabric to a tenter frame so as to compress the fabric in the machine direction.

27. A process as in claim 26, wherein said base fabric is a warp-knit, weft-inserted fabric whose weft insert yarns are biased with respect to its warp knit yarns, and wherein said weft yarns are substantially inextensible and said warp knit yarns exhibit a predetermined amount of extension in said machine direction.

28. A process as in claim 20, wherein said liquid elastomer at least partially impregnates said base fabric.

* * * * *